(No Model.)
P. DURHAM.
GRUBBING SHEARS.
No. 269,029. Patented Dec. 12, 1882.
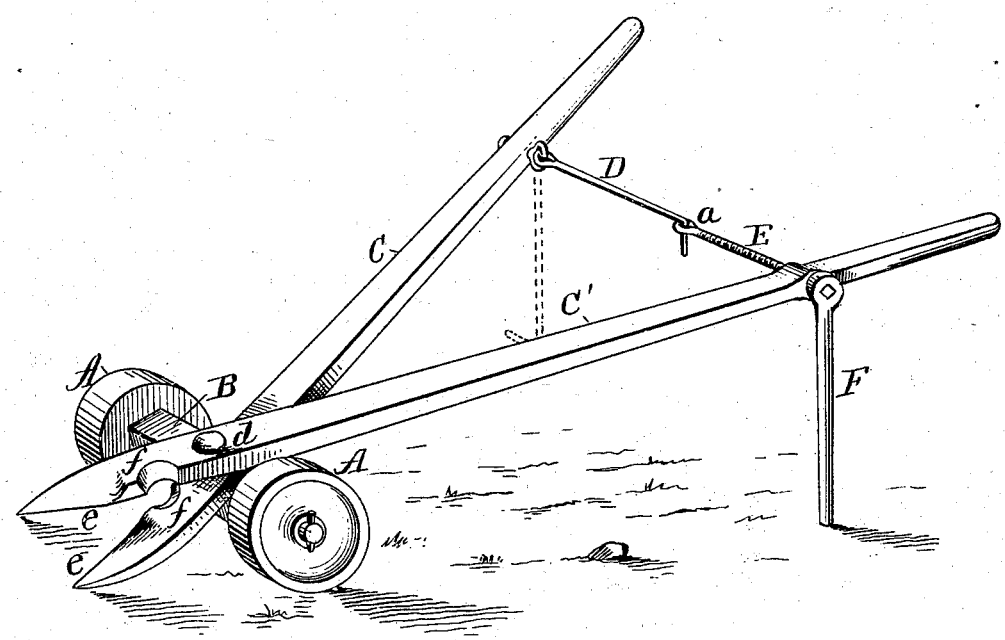
WITNESSES:
INVENTOR:
P. Durham
BY Munn & Co
ATTORNEYS.

UNITED STATES PATENT OFFICE.

PETER DURHAM, OF BROOKLYN, NEW YORK.

GRUBBING-SHEARS.

SPECIFICATION forming part of Letters Patent No. 269,029, dated December 12, 1882.

Application filed September 28, 1882. (No model.)

*To all whom it may concern:*

Be it known that I, PETER DURHAM, of Brooklyn, in the county of Kings and State of New York, have invented a new and Improved Grubbing-Shears, of which the following is a full, clear, and exact description.

My invention consists of a device for clearing land of underbrush, briars, weeds, &c., consisting of a heavy pair of shears mounted on a low strong truck, the shears being so formed that the underbrush, briars, weeds, &c., may either be cut off by them or grasped and uprooted, the handle ends of the shears serving as levers for this purpose.

My invention also consists in providing the handle ends of the shears with means for drawing them forcibly together for cutting off heavy brush and stalks that cannot be cut off by hand-power alone.

Reference is to be had to the accompanying drawing, forming part of this specification, in which the figure represents in perspective my new and improved grubbing-shears.

A A represent the wheels, and B the axle, of the truck; and C C' represent the jaws of the shears, which are pivoted upon the center of the axle by the pin $d$ passing down through them and down through the axle, as shown. The forward ends of the jaws C C' are formed with the corresponding cutting-edges, $e\ e$, for cutting off the brush, weeds, briars, &c., and with the corresponding recesses, $f\ f$, for firmly grasping a shrub or stalk for uprooting the same if found too large to be easily cut off by the cutting-edges of the shears.

For drawing the rear ends of the jaws C C' forcibly together for cutting off a large stalk or bush that could not be cut by hand-power alone, or for grasping a shrub more firmly than could be done by hand-power, I provide the jaw C, near its rear end, with the hooked and swiveled rod D, and the jaw C' with the screw-rod E, which runs in a screw-tap made through the jaw. The inner end of the rod E is formed with the eye $a$ to receive the hook on the inner end of the rod D, and the rod E is made square at its outer end for the application thereto of the winch F for turning the rod E for drawing the jaws together. The winch F and rod D also serve as legs for supporting the rear ends of the jaws when the device is not in use, as indicated in the drawing.

In use the device is to be shoved over the ground upon the truck for bringing the shears to the work. In case the brush, weeds, briars, &c., are of small size, they can be easily cut off by the cutting-edges $e\ e$ by simply operating the jaws by hand-power. When a stalk is reached that cannot be so cut off by hand-power it may either be grasped in the recesses $f\ f$ and uprooted by a downward pressure on the jaws C C', the axle B serving as a fulcrum, or the rods D and E may be brought into action for cutting it. To do this it is only necessary to hook the rod D into the eye $a$ of the rod E, and then take hold of the winch F and turn the rod E, which will cause the jaws to be drawn together with force sufficient to cut off a large stalk or sapling. The heavy stalk or bush having been cut, the rod D is to be unhooked from the eye of the rod E and the work continued as before.

Having thus described my invention, what I claim as new, and desire to secure by Letters Patent, is—

1. In a grubbing device, the wheels A A and axle B, in combination with shears C C', pivoted to the axle, the shears being formed with the cutting-edges $e\ e$ and recesses $f\ f$, whereby the device is adapted for cutting and uprooting underbrush, &c., as set forth.

2. The combination, with the truck and jaws C C', pivoted thereto, of the hooked and swiveled rod D, screw-rod E, and winch F, substantially as and for the purposes set forth.

PETER DURHAM.

Witnesses:
H. A. WEST,
C. SEDGWICK.